Figure 1:
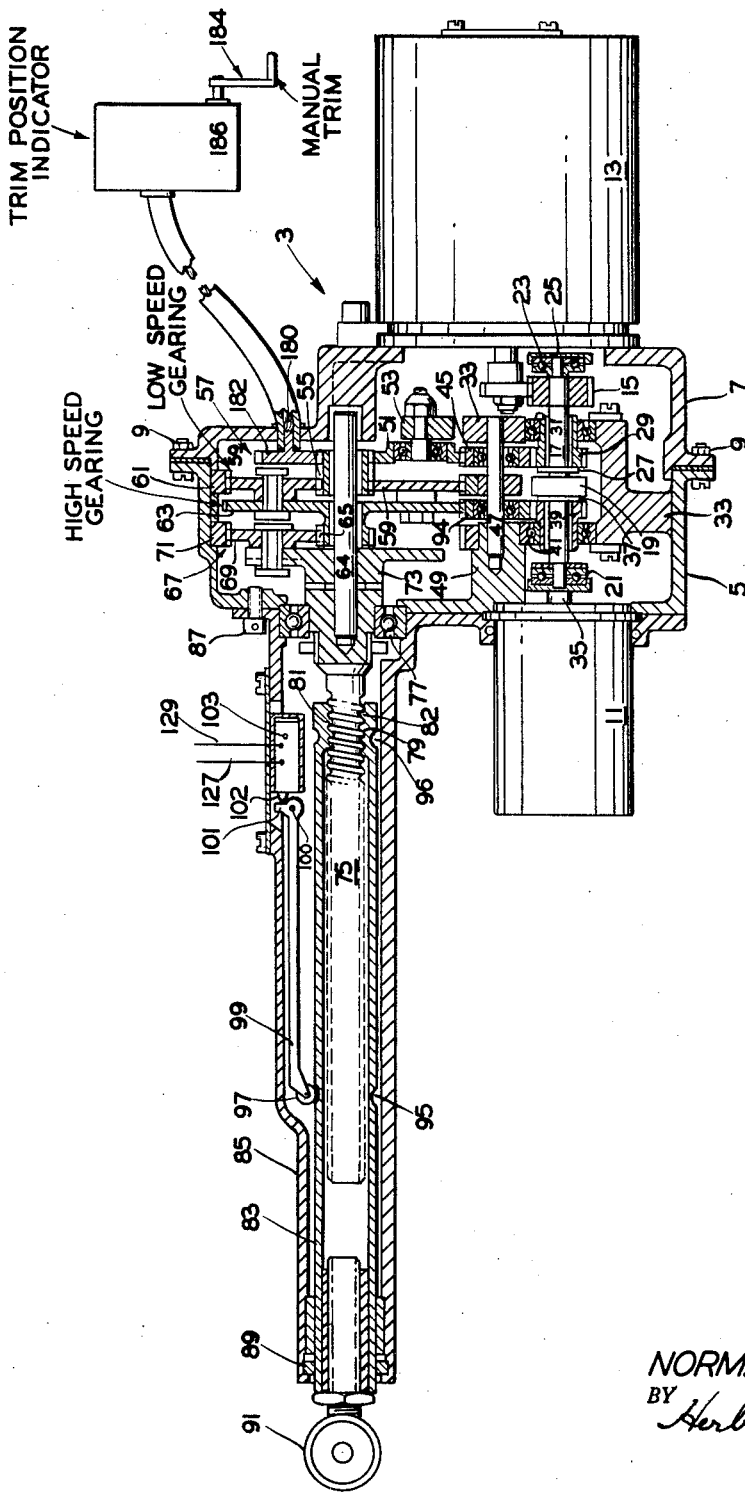

INVENTOR.
NORMAN B. MURPHY
BY Herbert L. Davis
ATTORNEY

INVENTOR.
NORMAN B. MURPHY
BY Herbert L. Davis
ATTORNEY

United States Patent Office 3,038,352
Patented June 12, 1962

3,038,352
DUAL SPEED TRIM ACTUATOR MECHANISM AND CONTROL SYSTEM FOR A CONTROL SURFACE OF AN AIRCRAFT
Norman B. Murphy, Tenafly, N.J., assignor to The Bendix Corporation, a corporation of Delaware
Filed Apr. 7, 1960, Ser. No. 20,640
12 Claims. (Cl. 74—626)

The invention relates to a dual speed trim actuator means and more particularly to a novel actuator mechanism and control system for a trim surface of an elevator, aileron or other control surface of an aircraft.

An object of the invention is to provide a novel actuator mechanism including an actuator motor or other power means for driving through a dual speed gearing a trim surface, together with an operator-operative means for selectively coupling the motor to the trim surface through the gearing at a relatively high speed ratio during manual control of the actuator motor as in the case of a landing maneuver of the aircraft and through the gearing at a relatively low speed ratio as during normal automatic pilot control of the actuator motor, together with manually operable means for positioning the actuator through the dual speed gearing at the low speed ratio as upon a failure in the actuator motor or electric power supply therefor.

Another object of the invention is to provide a novel actuator mechanism including an irreversible jackscrew driven by a two-stage planetary gear train in which a dual output speed is obtained through a solenoid operated clutch so arranged as to selectively couple the actuator motor to a first and a second stage of the planetary gear train so as to drive the jackscrew at relatively high and low speed ratios respectively.

Another object of the invention is to provide a novel actuator mechanism including a solenoid operated clutch biased by a spring to a first position to couple the actuator motor to gearing in the first stage of a planetary gear train so as to effect manually controlled high speed trim operation at such time as the solenoid is deenergized, while upon energization of the solenoid the clutch is actuated thereby to a second position to couple the actuator motor to gearing in the second stage of the planetary gear train so as to effect a relatively low speed trim operation upon control of the actuator motor by an automatic pilot system and in which arrangement the solenoid operated clutch is spring biased to the first mentioned position so as to provide a fail safe to the manual trim control position.

Another object of the invention is to provide in the aforenoted actuator mechanism a retractable member operated by a jackscrew and a novel limit switch device including means operable by detents in the retractable member to actuate the switch device so as to open the energizing circuit of the clutch controlling solenoid at extreme adjusted positions of the retractable member during automatic pliot control of the actuator mechanism so as to thereby limit the travel of the jackscrew operated retractable member by providing a fail safe to the manual control of the actuator mechanism.

Another object of the invention is to provide a trim button on the aircraft control column operable by the pilot of the aircraft to open the energizing circuit for the clutch control solenoid so that the actuator mechanism may be selectively operated on demand as a manually controlled trim actuator unit by the positioning of the pilot's control column, as during maneuvering of the aircraft for landing.

Another object of the invention is to provide with an actuator mechanism of the aforenoted type manual means for operating the trim tab upon electrical power failure by coupling a flexible shaft to the second stage of the gear train by means of an idler gear so that the gear train may be operated manually from the cabin of the aircraft with mechanical indication at the crank end provided to show the trim tab position.

Another object of the invention is to provide an actuator mechanism including a gear train capable of imparting two distinct trim speeds to the jackscrew of the actuator mechanism by the provision of a solenoid operated clutch effective to selectively couple the actuator motor to the jackscrew through first and second stages of a planetary gear train and so arranged that by opening the circuit for energizing the solenoid by actuating a trim button, provided for this purpose on an aircraft control-column, the operator may effect a manual flight configuration in which the clutch will be spring biased to a position for coupling the actuator motor to the jackscrew through first stage high-speed gearing, while upon the operator releasing the button so as to close the circuit for effecting energization of the clutch controlling solenoid, there may be effected an automatic flight control configuration in which the energized solenoid will cause the clutch to be biased to a second position and the jackscrew to be operatively coupled thereby to the actuator motor through a second stage low-speed gearing.

These and other objects and features of the invention are pointed out in the following description in terms of the embodiment thereof which is shown in the accompanying drawings. It is to be understood, however, that the drawings are for the purpose of illustration only and are not a definition of the limits of the invention, reference being had to the appended claims for this purpose.

Figure 2:
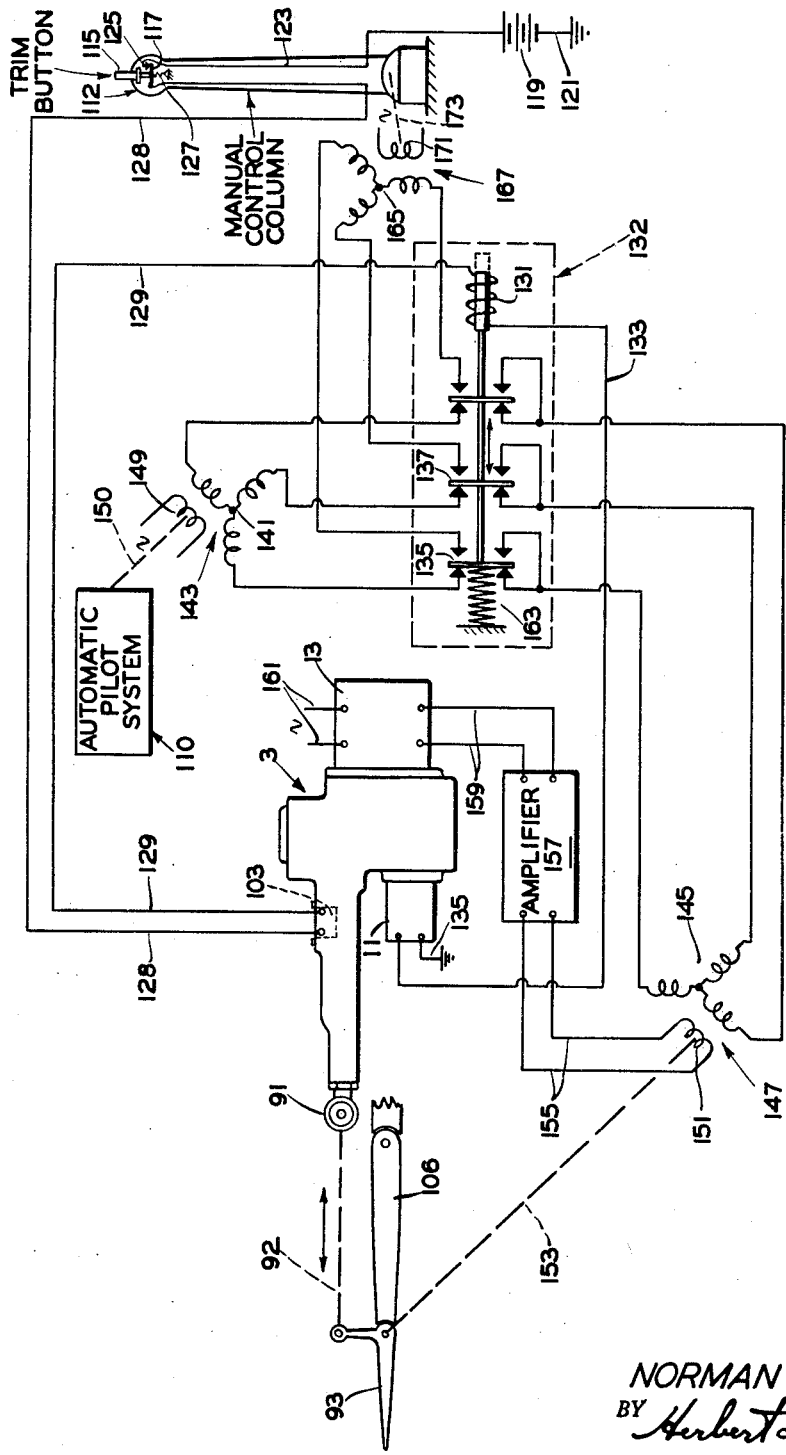

In the drawings:
FIGURE 1 is a sectional view of the dual speed trim actuator mechanism;
FIGURE 2 is a diagrammatic view of a control system in which the dual speed trim actuator mechanism is shown in operative relation.

Referring to the drawing of FIGURE 1, the dual speed trim actuator mechanism 3 includes a two-piece housing having parts 5 and 7 conveniently bolted together by bolts 9 and having secured to part 5 a control solenoid 11 and to housing part 7 an actuator motor 13 which may be of a conventional two-phase type.

The motor 13 is arranged to drive through gearing 15 a shaft 17 and clutch element 19. The shaft 17 is supported in bearings 21 and 23 mounted at opposite ends of the shaft 17 and so arranged that the shaft 17 and clutch 19 may be axially movable to the right as viewed in FIGURE 1 upon energization of the control solenoid 11. A suitable flat spring 25 is mounted adjacent the bearing 23 and arranged to axially bias the shaft 17 toward the left, as viewed in FIGURE 1, upon deenergization of the control solenoid 11, while upon energization of the solenoid 11 the clutch element 19 is actuated to the right by the solenoid 11 so as to engage in clutching relation a surface 27 of a gear member 29 freely rotatable on the shaft 17 and carried by bearing elements 31 supported by arm portion 33 projecting from the housing part 5.

Further, carrying the opposite bearing member 21 of the shaft 17 is an arm 35 operatively positioned by the control solenoid 11. Thus, upon energization of the solenoid 11 the arm 35 is actuated thereby so as to move the shaft 17 axially toward the left and against the biasing force of the spring 25. Such axial movement of shaft 17 in turn causes clutch 19 to disengage the clutch surface 27 of gear 29 and engage an opposite face 37 of a gear 39 freely rotatably on the shaft 17 and carried by bearing elements 41 supported by the arm portion 33 projecting from the housing part 5.

From the aforenoted arrangement it will be seen that upon energization of the control solenoid 11 the clutch element 19 is biased by the solenoid 11 so as to operatively connect motor 13 to the gear 29 while upon deenergization of the solenoid 11 the spring 25 biases the shaft 17 and thereby the clutch element 19 so as to drivingly connect the motor 13 to the gear 39.

As shown in FIGURE 1, the gear 29 is drivingly connected through a spur gear 45 rotatably carried by a shaft 47 supported by the arm portion 33 and a second arm portion 49 also projecting from the housing part 5 and through the spur gear 45 to a second spur gear 51 rotatably carried by an arm portion 53 projecting from the housing part 7. The spur gear 51 in turn engages a sun gear 55 of a low speed second stage planetary gear train 57.

The planetary gear train 57 includes the sun gear 55, planet gears 59 drivingly engaged by the sun gear 55, and a ring gear 61 affixed to the housing part 5. The planet gears 59 engage the fixed ring gear 61 and are in turn rotatably carried by a spider gear 63 which is in turn rotatably mounted on a shaft 64 carried by housing parts 5 and 7 and driven by the sun gear 55 and planet gears 59 in cooperative relation with the fixed ring gear 61.

The spider gear 63 has affixed thereto a sun gear 65 of a first stage planetary gear train 67. The first stage planetary gear train 67 in turn includes planet gear 69 driven by the sun gear 65 and engaging a ring gear 71 affixed to the housing part 5. The planet gear 69 is in turn rotatably supported by a spider plate 73 which is in turn driven by the sun gear 55 and planet gear 69 in cooperative relation with the fixed ring gear 61. The spider plate 73 is drivingly connected to a jackscrew 75 of conventional type.

The jackscrew 75 is rotatably supported on an end of shaft 64 and in bearings 77 carried by the housing portion 5. Screw threads 79 are provided on the jackscrew 75 so as to operatively engage in corresponding screw threads 81 in a packscrew nut 82 forming a part of a retractable member 83. The retractable member 83 is slidably mounted in a tubular member 85 affixed at one end by bolts 87 to the housing part 5 and having at the opposite end a bearing member 89 for maintaining the retractable member 83 against rotary movement while permitting axial movement thereof by the jackscrew 75. At the outer free end of the retractable member 83 there is provided a member 91 to which may be connected operating linkage 92 for imparting movement to a trim surface 93, as shown diagrammatically in FIGURE 2.

The screw threads 79 of the jackscrew 75 and corresponding screw threads 81 of the nut 82 have a helix angle such that the retractable member 83 in normal operation is not movable by axial force applied at the output end and in normal operation is axially movable only by the rotary movement imparted at the input end to the jackscrew 75 through the planetary gear mechanisms 57—67.

Thus, upon deenergization of the solenoid 11 the motor 13 is coupled through the clutch 19 to the gearings 29, 45, 51 and 55 and thereby to the planet gear 59 so as to drive the jackscrew 75 at a low speed ratio through the two-stage planetary gear train 57—67. However, upon energization of the solenoid 11 the motor 13 is coupled through the clutch 19 to the gear 39 of a higher speed ratio gear train instead of to the gear 29 of the lower speed ratio gear train. The gear 39 in turn engages a spur gear 94 rotatably supported by the shaft 47 and drivingly engaging teeth of the spider gear 63 so arranged as to drive the sun gear 65 of the first stage planetary gear train 67 at a higher speed ratio than the low speed ratio effected through the planet gears 59 by the sun gear 55 of the second stage planetary gear train 57.

Accordingly, upon energization of the control solenoid 11 the motor 13 becomes effective for driving the jackscrew 75 through the first stage planet gear train 67 at a relatively high speed ratio while upon deenergization of the control solenoid 11 the motor 13 is effective for driving the jackscrew 75 through the planet gear trains 57—67 at a relatively low speed ratio.

As shown in FIGURE 1, there is further provided in the retractable member 83 detents 95 and 96 in which a roller element 97 carried by an arm 99 pivoted at 100 is adapted to ride at extreme adjusted inward or outward positions of the member 83. The arm 99 has an end portion 101 cooperating with an actuator button 102 of a limit switch 103 so that upon movement of the roller 97 into detent 95 or 96 at such extreme positions of the member 83 the button 102 of the limit switch 103 is thereupon actuated by the resulting movement of the arm 99 in a counterclockwise direction so as to open the limit circuit, as hereinafter explained with reference to the control system of the schematic drawing of FIGURE 2. In normal operation the roller 97 is positioned out of the detents 95 and 96 so that the arm 99 is actuated about the pivot 100 in a clockwise direction from the position shown to a position causing the limit switch 103 to close the limiting circuit. The limit switch 103 may be of a conventional miniature type biased by suitable spring means, not shown, to a circuit open position.

*Control System*

Referring now to the schematic drawing of FIGURE 2 the two-speed trim actuator mechanism indicated generally by the numeral 3 is shown in operative relation in the control system for actuating through the linkage 92 the trim surface 93 of an elevator, aileron or other conventional type control surface 106 of an aircraft. In the aforenoted control system, the trim surface 93 may be operatively positioned by the actuator mechanism 3 under control of an automatic pilot control system 110 or alternatively under control of a manual control-column 112.

The manual control-column 112 may be of a type such as disclosed and claimed in U.S. application Serial No. 840,987 filed September 18, 1959 for reissue of U.S. Patent No. 2,861,756 granted November 25, 1958 to Robert E. Feucht, John Jarvis and John C. Ziegler or of a type such as disclosed and claimed in U.S. application Serial No. 816,785 filed May 29, 1959 by John C. Ziegler, Lucien R. Beauregard and Harry Langer. The aforesaid patent and both applications are assigned to Bendix Aviation Corporation, the assignee of the present invention.

In the manual control-column 112 there is provided a trim button 115 operable by the operator of the control-column 112 so as to actuate a switch element 117 to open a circuit to effectively deenergize the control solenoid 11. The aforenoted control circuit may include a battery 119 having one terminal grounded at 121 and the opposite terminal connected through a conductor 123 to a contact element 125 normally closed by the switch element 117 under the biasing force of a spring 127. The switch element 117 is in turn connected by a conductor 128 through the limit switch 103, heretofore described and which is normally in a closed circuit position, so as to in turn connect the conductor 128 to a conductor 129 leading to a relay winding 131 of a gang relay 132 and through a conductor 133 to the control solenoid 11, the opposite terminal of which is grounded by a conductor 135.

Thus, upon actuation of the trim button 115 against the biasing force of spring 127 so as to cause switch element 117 to open switch contact 125, the control solenoid 11 is deenergized so that the motor 13 may be effective to drive the jackscrew 75 through the first stage planetary gearing 67. However, upon the trim button 115 being released and the switch element 117 closing contact 125 under the biasing force of spring 127 the motor 13 is thereafter effective for driving the jackscrew 75 at a much slower speed through the second stage gearing 57.

As may be seen from the circuit of FIGURE 2, energization of the control solenoid 11 will also effectively energize the solenoid 131 of the gang relay 132 so as to actuate switch elements 135, 137 and 139 to a position shown in FIGURE 2 to effectively close circuits for connecting stator windings 141 of a synchro 143 to corresponding stator windings 145 of a synchro 147. The synchro 143 has a rotor winding 149 connected across a suitable source of alternating current and operatively positioned through shaft 150 by the automatic pilot system 110 in inductive relation to the stator windings 141.

The synchro 147 similarly has provided a rotor winding 151 coupled in inductive relation to the stator windings 145 and operatively positioned through a shaft 153 connected to the trim surface 93 and actuator linkage 92 so as to follow the adjusted position of the trim surface 93. The rotor winding 151 is in turn connected through electrical conductors 155 to the input of an amplifier 157 of conventional type. Output conductors 159 lead from the amplifier 157 to the control winding of the motor 13 which may be of a two-phase type having a fixed phase winding connected through conductors 161 to the source of alternating current and a variable phase winding connected through the conductors 159 to the control signal provided by the synchro 147.

Thus, with the trim button 115 in a normal position closing the switch 117 and the limit switch 103 in the normal closed position, it will be seen that the automatic pilot system will effectively control through the transmitter synchro 143, gang relay 132 and follow-up synchro 147, the motor 13 so as to cause the jackscrew 75 driven by the motor 13 through the second stage planetary gearing 57 to adjustably position the trim surface 93 to meet the requirements of the automatic pilot system 110. Such automatic pilot control operation may be effective then during normal flight operation of the aircraft. However, should the operator of the plane desire to take over manual control of the trim surface 93, as upon a landing maneuver of the aircraft, the trim button 115 may then be actuated so as to cause switch element 117 to open the switch contact 125 to deenergize the control solenoid 11 and the gang relay winding 131.

Upon such deenergization of the control solenoid 11, the motor 13 is then effective to drive the jackscrew 75 at a higher speed ratio through the first stage planetary gearing 67, while the deenergization of the gang relay winding 131 will in turn cause the switch elements 135, 137 and 139 to be biased by a spring 163 to the right of the position shown in FIGURE 2 so as to disconnect the stator windings 141 of the synchro 143 from the stator windings 145 of the synchro 147 and in place thereof effectively connect stator windings 165 of a synchro 167 to the stator windings 145 of the synchro 147.

The synchro 167 has a rotor winding 171 which is connected across the suitable source of alternating current and may be rotatably positioned in inductive relation to the stator windings 165 through a shaft 173 operated by movement imparted to the manual control-column 112, as explained in the aforenoted patent and copending applications.

It will be seen then that adjustment of the manual control-column 112 imparts movement to the rotor winding 171 which will in turn effect a corresponding signal in the rotor winding 151 of the synchro 147 which will cause the motor 13 to actuate the jackscrew 75 at a relatively high speed ratio to cause an adjustment of the trim surface 93 corresponding to that called for by the movement imparted to the manual control-column 112.

Thus, upon selective operation of the trim button 115, the actuator mechanism 3 may under manual control effectively position the trim surface 93 at a relatively high speed ratio and upon a release of the trim button 115 closing the switch 117, the control of the trim surface 93 may be effected by the automatic pilot system 110 through the actuator mechanism 3 at a relatively lower speed ratio. Moreover, the operation of the limit switch 103 at the extreme inward or outward adjusted positions of the retractable member 83 will also effectively open the energizing circuit for the control solenoid 11 and gang relay 131 to return control of the actuator mechanism 3 to the manual control and effectively prevent adjustment of the jackscrew 75 under control of the automatic pilot system past a predetermined limit position as determined by the detents 95 and 96. The manual control-column 112 may, of course, be so adjusted or have its limits of adjustment so arranged as not to exceed the range determined by the detents 95 and 96 on the retractable member 83.

A manual override feature is also provided so that in the event of electrical power failure the trim surface 93 may be manually positioned. This is accomplished by coupling a flexible shaft 180 by an idler gear 182 to the sun gear 55 of the second stage planetary gear train 57 and providing for the flexible shaft 180 to be operated manually from the cabin of the aircraft by a crank 184. There may be further provided a mechanical trim indicator 186 in the cabin of the aircraft connected to the flexible shaft 180 so as to indicate the position of the trim surface. Crank 184 may be of a conventional type arranged so as to be selectively coupled by the operator in and out of driving relation with the flexible shaft 180 and indicator 186 as may be desired.

*Operation*

It will be seen from the aforenoted arrangement that there is provided a novel two-speed trim actuator mechanism 3 including an irreversible jackscrew 75 driven by a two-stage planetary gear train 57—67 in which mechanism dual output speed is obtained through a solenoid 11 operated clutch 19 which couples the servomotor 13 to either the first or second stages of the planetary gear train 57—67. The solenoid clutch 11 is biased by spring 25 into a position to couple the motor 13 to the first stage planetary gear train 67 for manual trim control at a relatively high speed ratio when the solenoid 11 is not energized.

In the automatic control operation of the trim surface 93 by the automatic pilot system 110, the solenoid 11 will maintain the motor 13 coupled to the second stage planetary gear train 57 for low speed operation. The solenoid 11 operated clutch 19, biased by the spring 25 to the first mentioned position, serves to provide a fail safe to the manual control position.

The automatic operation of the actuator mechanism 3 may be limited electrically, as shown, through a limit switch 103 mounted in the tubular member 85 and operatively connected to the follower 99 at the output end of the retractable member 83. The arrangement is such that detents 95 and 96 in the retractable member 83 are provided at predetermined positions to limit travel at both extremes by causing at such positions actuation of the follower 99 and thereby actuation of the limit switch 103 for returning the control of the actuator mechanism to the manual trim position.

Further, a manual means 180—184 is provided for positioning the trim surface 93 should electrical power fail. This is accomplished by coupling a flexible shaft 180 at the second stage of the gear train by means of idler gear 182. The flexible shaft 180 may then be operated manually by the pilot by a crank 184 accessible in the cabin of the aircraft and may include a mechanical indicator 186 of conventional type to show the position of the trim surface 93.

Although only one embodiment of the invention has been illustrated and described, various changes in the form and relative arrangements of the parts, which will now appear to those skilled in the art may be made without departing from the scope of the invention. Reference is, therefore, to be had to the appended claims for a definition of the limits of the invention.

What is claimed is:

1. An actuator mechanism comprising a jackscrew means, motor means, and transmission means for drivingly connecting the motor means to said jackscrew means, said transmission means including a first driving means and a second driving means having a different speed transmission ratio than said first driving means, electromagnetic means to selectively connect said motor means to said jackscrew means through said first and second driving means, operator-operative switch means for controlling said electromagnetic means, and other switch means operated by said jackscrew means for rendering said electromagnetic means ineffective to connect said motor means to said jackscrew means through said first driving means at a predetermined adjusted position of said jackscrew means.

2. An actuator mechanism comprising a rotatable jackscrew means, motor means, a two-stage planetary gearing for drivingly connecting the motor means to said rotatable jackscrew means, said two-stage planetary gearing including a first stage planetary gearing and a second stage planetary gearing, means to selectively couple said motor means to said first and second stage planetary gearing to rotate said jackscrew means thereby at different speed transmission ratios, said selective coupling means including a rotatable shaft, means drivingly connecting said motor means to said shaft, a coupling member mounted on said shaft intermediate the opposite ends thereof, a driven member at one side of the coupling member and drivingly connected to the first stage planetary gearing, another driven member at an opposite side of said coupling member and drivingly connected to the second stage planetary gearing, spring means biasing said shaft axially in one sense and thereby said coupling member into driving relation with one of said driven members, electromagnetic means for biasing said shaft axially in an opposite sense and thereby said coupling member into driving relation with the other of said driven members, and operator-operative means for controlling said electromagnetic means.

3. The combination defined by claim 2 in which said operator-operative means includes switch means for controlling energization of said electromagnetic means, and said jackscrew means includes a second switch means actuated at a predetermined adjusted position of the jackscrew means to open an energizing circuit for the electromagnetic means and render the first mentioned switch means of the operator-operative means ineffective to control the energization of the electromagnetic means.

4. For use in an aircraft of a type including an operator-operative control system, an automatic pilot control system, and an adjustably positioned control surface; the combination comprising actuator means for positioning the control surface, motor means, transmission means for drivingly connecting the motor means to said actuator means, said transmission means including a first driving means and a second driving means having a different transmission ratio from said first driving means, coupling means operative in one sense to drivingly connect said motor means to said actuator means through one of said driving means and operative in another sense to drivingly connect said motor means to said actuator means through the other of said driving means, transfer means operable in one sense to operatively connect said operator-operative control system to said motor means and operable in another sense to operatively connect said automatic pilot control system to said motor means so that said motor means may be selectively controlled by said control systems dependent upon the operative sense of the transfer means, and control means operative to selectively render said coupling means and said transfer means operative in said one and said other senses.

5. For use in an aircraft of a type including an operator-operative control system, an automatic pilot control system, and an adjustably positioned control surface; the combination comprising actuator means for positioning the control surface, motor means, transmission means for drivingly connecting the motor means to said actuator means, said transmission means including a first driving means and a second driving means having a different transmission ratio from said first driving means, coupling means operative in one sense to drivingly connect said motor means to said actuator means through one of said driving means and operative in another sense to drivingly connect said motor means to said actuator means through the other of said driving means, transfer means operable in one sense to operatively connect said operator-operative control system to said motor means and operable in another sense to operatively connect said automatic pilot control system to said motor means so that said motor means may be selectively controlled by said control systems dependent upon the operative sense of the transfer means, control means being operative by said actuator means and normally effective to jointly render said coupling means and said transfer means operative in one of said senses, and said control means being operative by said actuator means and effective at a predetermined adjusted position of the actuator means to render said coupling means and said transfer means jointly operative in the other of said senses.

6. For use in an aircraft of a type including an operator-operative control system, an automatic pilot control system, and an adjustably positioned control surface; the combination comprising actuator means for positioning the control surface, motor means, transmission means for drivingly connecting the motor means to said actuator means, said transmission means including a first driving means and a second driving means having a different transmission ratio from said first driving means, coupling means operative in one sense to drivingly connect said motor means to said actuator means through one of said driving means and operative in another sense to drivingly connect said motor means to said actuator means through the other of said driving means, transfer means operable in one sense to operatively connect said operator-operative control system to said motor means and operable in another sense to operatively connect said automatic pilot control system to said motor means so that said motor means may be selectively controlled by said control systems dependent upon the operative sense of the transfer means, and operator-operative control means operable to jointly render said coupling means and said transfer means operative in one of said senses and alternately operable to jointly render said coupling means and said transfer means operative in the other of said senses.

7. For use in an aircraft of a type including an operator-operative control system, an automatic pilot control system, and an adjustably positioned control surface; the combination comprising actuator means for positioning the control surface, motor means, transmission means for drivingly connecting the motor means to said actuator means, said transmission means including a first driving means and a second driving means having a different transmission ratio from said first driving means, coupling means operative in one sense to drivingly connect said motor means to said actuator means through one of said driving means and operative in another sense to drivingly connect said motor means to said actuator means through the other of said driving means, transfer means operable in one sense to operatively connect said operator-operative control system to said motor means and operable in another sense to operatively connect said automatic pilot control system to said motor means so that said motor means may be selectively controlled by said control systems dependent upon the operative sense of the transfer means, operator-operative control means effective in one adjusted position thereof to jointly render said coupling means and said transfer means operative in one of said senses and alternately effective in another adjusted position thereof to jointly render said coupling means and said transfer means operative in the other of said senses, and other control means operative by said actuator means and effective at a predetermined adjusted position of the actuator means to override the effect of said operator-operative control means when in said one adjusted position so as to render said coupling means and said transfer means jointly operative in the other of said senses.

8. In an aircraft of a type including an operator-operative control system, an automatic pilot control system, and an adjustably positioned control surface; the combination comprising actuator means for positioning said control surface, motor means, transmission means for drivingly connecting the motor means to said actuator means, said transmission means including a first stage planetary gearing and a second stage planetary gearing, coupling means being operable in a first sense to drivingly connect said motor means to said first stage planetary gearing and thereby through said first stage planetary gearing to said actuator means, said coupling means being operable in a second sense to drivingly connect said motor means to said second stage planetary gearing and thereby through said second and first stage planetary gearings to said actuator means at a relatively slower speed transmission ratio, transfer relay means being operable in a first sense to operatively connect said operator-operative control system to said motor means, said transfer relay means being operable in a second sense to operatively connect said automatic pilot control system to said motor means, said motor means being thereby selectively controlled by said control systems dependent upon the operative sense of said transfer relay means, a first electromagnetic means for selectively operating said coupling means in said first and second senses, a second electromagnetic means for selectively operating said transfer relay means in said first and second senses, control means for effecting joint operation of said first and second electromagnetic means to cause a simultaneous operation of said coupling means and said transfer relay means in said first sense and alternately a simultaneous operation of said coupling means and said transfer relay means in said second sense.

9. In an aircraft of a type including an operator-operative control system, an automatic pilot control system, and an adjustably positioned control surface; the combination comprising actuator means for positioning said control surface, motor means, transmission means for drivingly connecting the motor means to said actuator means, said transmission means including a first stage planetary gearing and a second stage planetary gearing, coupling means being operable in a first sense to drivingly connect said motor means to said first stage planetary gearing and thereby through said first stage planetary gearing to said actuator means, said coupling means being operable in a second sense to drivingly connect said motor means to said second stage planetary gearing and thereby through said second and first stage planetary gearings to said actuator means at a relatively slower speed transmission ratio, transfer relay means being operable in a first sense to operatively connect said operator-operative control system to said motor means, said transfer relay means being operable in a second sense to operatively connect said automatic pilot control system to said motor means, said motor means being thereby selectively controlled by said control systems dependent upon the operative sense of said transfer relay means, a first electromagnetic means for selectively operating said coupling means in said first and second senses, a second electromagnetic means for selectively operating said transfer relay means in said first and second senses, operator-operative control means for effecting joint operation of said first and second electromagnetic means to cause a simultaneous operation of said coupling means and said transfer relay means in said first sense and alternately a simultaneous operation of said coupling means and said transfer relay means in said second sense, and other control means operative at a predetermined adjusted position of said actuator means to render said operator-operative control means ineffective and operation of said first and second electromagnetic means effective in a sense to cause a simultaneous operation of said coupling means and said transfer relay means in said first sense, whereupon said operator-operative control system is operatively connected through said transfer relay means to said motor means and said motor means is drivingly connected through said coupling means to said first stage planetary gearing and thereby to said actuator means.

10. In an aircraft of a type including an operator-operative control system, an automatic pilot control system, and an adjustably positioned control surface; the combination comprising a rotatable jackscrew means for positioning said control surface, motor means, transmission means for drivingly connecting the motor means to said jackscrew means, said transmission means including a first stage planetary gearing and a second stage planetary gearing, coupling means including a rotatable shaft, means drivingly connecting said motor means to said shaft, a coupling member mounted on said shaft intermediate the opposite ends thereof, a first driven member at one side of the coupling member and drivingly connected to the first stage planetary gearing, a second driven member at an opposite side of said coupling member and drivingly connected to the second stage planetary gearing, spring means biasing said shaft axially in a first sense and thereby said coupling member into driving relation with said first driven member to drivingly connect said motor means to said first stage planetary gearing and thereby through said first stage planetary gearing to said jackscrew means, a first electromagnetic means for biasing said shaft axially in an opposite second sense and thereby said coupling member into driving relation with said second driven member to drivingly connect said motor means to said second stage planetary gearing and thereby through said second and first stage planetary gearings to said jackscrew means at a relatively slower speed transmission ratio; transfer relay means being operable in a first sense to operatively connect said operator-operative control system to said motor means, said transfer relay means being operable in a second sense to operatively connect said automatic pilot control system to said motor means, said motor means being thereby selectively controlled by said control systems dependent upon the operative sense of said transfer relay means, a second electromagnetic means for selectively operating said transfer relay means in said first and second senses, control means for effecting joint operation of said first and second electromagnetic means to cause a simultaneous operation of said coupling means and said transfer relay means in said first sense and alternately a simultaneous operation of said coupling means and said transfer relay means in said second sense.

11. In an aircraft of a type including an operator-operative control system, an automatic pilot control system, and an adjustably positioned control surface; the combination comprising a rotatable jackscrew means for positioning said control surface, motor means, transmission means for drivingly connecting the motor means to said jackscrew means, said transmission means including a first stage planetary gearing and a second stag planetary gearing, coupling means including a rotatable shaft, means drivingly connecting said motor means to said shaft, a coupling member mounted on said shaft intermediate the opposite ends thereof, a first driven member at one side of the coupling member and drivingly connected to the first stage planetary gearing, a second driven member at an opposite side of said coupling member and drivingly connected to the second stage planetary gearing, spring means biasing said shaft axially in a first sense and thereby said coupling member into driving relation with said first driven member to drivingly connect said motor means to said first stage planetary gearing and thereby through said first stage planetary gearing to said jackscrew means, a first electromagnetic means for biasing said shaft axially in an opposite second sense and thereby said coupling member into driving relation with said second driven member to drivingly connect said motor means to said second stage planetary gearing and thereby through said second and first stage planetary gearings to said jackscrew means at a relatively slower speed transmission ratio; transfer relay means being operable in a first sense to operatively connect said operator-operative control system to said motor means, said transfer relay means being operable in a second sense to operatively connect said automatic pilot control system to said motor means, said motor means being thereby selectively controlled by said control systems dependent upon the operative sense of said transfer relay means, a second electromagnetic means for selectively operating said transfer relay means in said first and second senses, operator-operative control means for effecting joint operation of said first and second electromagnetic means to cause a simultaneous operation of said coupling means and said transfer relay means in said first sense and alternately a simultaneous operation of said coupling means and said transfer relay means in said second sense, and other control means operative at a predetermined adjusted position of said jackscrew means to render said operator-operative control means ineffective and operation of said first and second electromagnetic means effective in a sense to cause a simultaneous operation of said coupling means and said transfer relay means in said first sense, whereupon said operator-operative control system is operatively connected through said transfer relay means to said motor means and said motor means is drivingly connected through said coupling means to said first stage planetary gearing and thereby to said jackscrew means.

12. An actuator mechanism comprising a jackscrew means, motor means, and transmission means for drivingly connecting the motor means to said jackscrew means so that said motor means may adjustably position said jackscrew means, first and second independently operable means for controlling said motor means, transfer means operable in one sense to operatively connect said first control means to said motor means and operable in another sense to operatively connect said second control means to said motor means so that said motor means may be selectively controlled by said first and second control means dependent upon the operative sense of the transfer means, said transmission means including a first driving means and a second driving means having a different speed transmission ratio than said first driving means, electromagnetic means to selectively connect said motor means to said jackscrew means through said first and second driving means, and operator-operative means for controlling said transfer means so as to selectively connect said first and second control means to said motor means and said electromagnetic means so as to selectively connect the motor means to said jackscrew means through said first and second driving means.

References Cited in the file of this patent

UNITED STATES PATENTS

| | | |
|---|---|---|
| 2,315,110 | Dornier | May 30, 1943 |
| 2,387,713 | Bradford | Oct. 30, 1945 |
| 2,387,800 | Le Land et al. | Oct. 30, 1945 |
| 2,634,623 | Kron | Apr. 14, 1953 |
| 2,809,736 | Hoover | Oct. 15, 1957 |
| 2,812,670 | Winther | Nov. 12, 1957 |
| 2,927,473 | Bentley | Mar. 8, 1960 |

FOREIGN PATENTS

| | | |
|---|---|---|
| 449,470 | Italy | June 18, 1949 |